(12) United States Patent
Yu

(10) Patent No.: US 12,273,740 B2
(45) Date of Patent: Apr. 8, 2025

(54) PROCESSING CIRCUITRY, PROCESSING MEANS, METHODS AND COMPUTER PROGRAMS FOR BEAMFORMING MANAGEMENT MODE SELECTION BASED ON PATH LOSS

(71) Applicant: Intel Corporation, Santa Clara, CA (US)

(72) Inventor: Zhibin Yu, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 17/754,312

(22) PCT Filed: Dec. 23, 2019

(86) PCT No.: PCT/US2019/068251
§ 371 (c)(1),
(2) Date: Mar. 30, 2022

(87) PCT Pub. No.: WO2021/133374
PCT Pub. Date: Jul. 1, 2021

(65) Prior Publication Data
US 2022/0345907 A1    Oct. 27, 2022

(51) Int. Cl.
*H04W 16/28* (2009.01)
*H04B 17/318* (2015.01)
*H04L 5/00* (2006.01)

(52) U.S. Cl.
CPC .......... *H04W 16/28* (2013.01); *H04B 17/318* (2015.01); *H04L 5/0051* (2013.01)

(58) Field of Classification Search
CPC .. H04W 16/28; H04W 52/367; H04B 17/318; H04B 7/0617; H04L 5/0051
See application file for complete search history.

(56) References Cited

U.S. PATENT DOCUMENTS

| 10,797,762 B1* | 10/2020 | Sung | H04B 7/0617 |
| 2009/0046594 A1* | 2/2009 | Zhou | H04L 1/0015 370/252 |

(Continued)

FOREIGN PATENT DOCUMENTS

| KR | 10-2015-0052482 A | 5/2015 |
| WO | 2018009462 A1 | 1/2018 |
| WO | 2018175714 A1 | 9/2018 |

*Primary Examiner* — Afshawn M Towfighi
(74) *Attorney, Agent, or Firm* — 2SPL Patent Attorneys PartG mbB; Kieran O'Leary

(57) ABSTRACT

Examples relate to processing circuitry, processing means, methods and computer programs for a base station and a user equipment. The processing circuitry for the base station is configured to select one of a first uplink beamforming management mode and a second uplink beamforming mode for a beamformed uplink communication between a user equipment and the base station. The selection is based on a path loss on a first wireless channel between the base station and the user equipment and based on a path loss on a second wireless channel between the user equipment and the base station. The processing circuitry is configured to provide an instruction related to the selection of the first or second uplink beamforming management mode to the user equipment.

23 Claims, 7 Drawing Sheets

(56) References Cited

U.S. PATENT DOCUMENTS

| | | | |
|---|---|---|---|
| 2010/0074301 A1* | 3/2010 | Howard | H04B 7/0617 |
| | | | 375/267 |
| 2013/0072244 A1 | 3/2013 | Jeong et al. | |
| 2013/0301551 A1* | 11/2013 | Ghosh | H04L 27/266 |
| | | | 370/329 |
| 2017/0331670 A1* | 11/2017 | Parkvall | H04L 41/0816 |
| 2018/0343096 A1* | 11/2018 | Kim | H04L 27/2602 |
| 2019/0280835 A1* | 9/2019 | Määttänen | H04L 5/0053 |
| 2020/0314770 A1* | 10/2020 | Wu | H04W 52/383 |
| 2021/0022091 A1* | 1/2021 | Li | H04W 52/242 |
| 2021/0314039 A1* | 10/2021 | Khalid | H04W 64/003 |
| 2023/0309021 A1* | 9/2023 | Bai | H04W 52/325 |

\* cited by examiner

PROCESSING CIRCUITRY, PROCESSING MEANS, METHODS AND COMPUTER PROGRAMS FOR BEAMFORMING MANAGEMENT MODE SELECTION BASED ON PATH LOSS

CROSS-REFERENCE TO RELATED APPLICATION

This application is a 35 U.S.C. § 371 (c) national stage entry of International Application PCT/US2019/068251, filed on Dec. 23, 2019. The content of this earlier filed application is incorporated by reference herein in its entirety.

FIELD

Examples relate to processing circuitry, processing means, methods and computer programs for a base station and a user equipment.

BACKGROUND

Beamforming can significantly improve the wireless spectrum efficiency with reduced intercell interferences. Analog beamforming has been introduced in 5G New Radio (NR) millimeter-wave (mmWave) communications for frequency range 2 (FR2). It allows a User Equipment (UE) and g-Node B (gNB) to change the directivity of the antenna arrays in both transmitter and receiver side.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
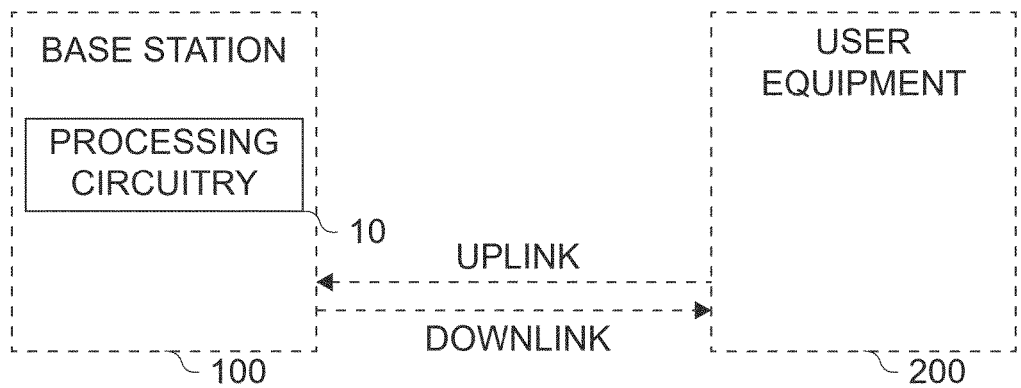
FIGS. 1a and 1b show block diagrams of examples of processing circuitry or processing means for a base station.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples relate to the implementation of base stations and user equipment, for example particular to the implementation of 5G ($5^{th}$ generation of Third Generation Partnership Project (3GPP)-standardized mobile communication networks) base stations. Example provide a method for adaptive uplink beam management mode selection by online channel reciprocity evaluation. At least some examples will be introduced in the terminology used in 5G NR communication, but the concepts can readily adapted to other mobile communication systems or generations/implementations of the shown mobile communication system as well.

In the current 3GPP Bean Management (BM) framework, for uplink (UL) beam management, gNB (g-Node B, a base station of a mmWave-based subset of 5G) and UE (User Equipment) target at finding a best antenna directivity pair in between a gNB receiver beam and UE transmitter beam. This may be realized in two alternative modes, which is selected by the base station:

UL BM mode 1 (e.g. a first uplink beamforming management mode): By assuming full channel reciprocity and UE/gNB Radio Frequency (RF) design may support full beam correspondence (BC) accuracy. The gNB may directly configure a spatial DownLink (DL) Reference Signal (RS) for a target UpLink (UL) channel, so that the UE may reuse same beam pattern, which is acquired based on measuring the configured spatial DL RS, for transmitting the target UL channel. This alternative mode may introduce less spectrum overhead because UL BM may reuse the results from DL BM.

UL BM mode 2 (e.g. a second uplink beamforming management mode): When full channel reciprocity does not hold, or when gNB/UE RF design cannot support full beam correspondence accuracy (e.g. due to temperature drifting), gNB may trigger the UE to apply SRS (Sounding Reference Signal) based TX (Transmission) beam sweeping, and accordingly select the best UE beam candidate in gNB RX (Receive) side. This alternative mode may introduce higher spectrum overhead because extra SRS resources may be triggered for UE TX beam sweeping.

As a master of the scheduling, the gNB may select the UL BM mode between the above two modes. In some systems, the selection may be static, based on the beam correspondence capability of a UE: For example, UL BM mode 1 is selected if the UE indicates that it supports beam correspondence accuracy. Instead, UL BM mode 2 may be selected if the UE indicates that it does NOT support beam correspondence accuracy. The static selection, which is based on UE capability information, might not provide an optical performance optimal, as channel reciprocity and beam correspondence accuracy may depend on the environment (e.g. temperature, e.g. UE mobility). Examples of the present disclosure may thus aim at further improving UL BM performance.

Examples provide a method for a base station to run-time evaluate the channel reciprocity, and then dynamically select between the two different UL BM modes, within a gNB. In particular, the channel reciprocity evaluation may be realized by comparing the uplink path loss (UL PL) and the down-link path loss (DL PL). In examples, this may be implemented by a base station (gNB) to determine the UL PL and DL PL, without changing the current 3GPP standard:

First, in some examples, the DL PL may be determined by the gNB, e.g. by trigging a L1-RSRP (Layer 1-Reference Signal Received Power) report of a DL RS, and then computing the power difference between the gNB transmission power of the DL RS (SSB (Synchronization Signal Block)/CSI-RS (Channel State Information-Reference signal)), and the UE reported L1-RSRP of the same DL RS.

Second, in some examples, the UL PL may be determined by the gNB, by taking a UL RSRP measurement of a received PUSCH DMRS (Physical Upload Shared Channel Demodulation Reference Signal), and then computing the power difference between the measured PUSCH DMRS RSRP (Reference Signal Received Power), and the UE transmission power of the PUSCH DMRS. In particular, the UE transmission power of the PUSCH DMRS may be further determined by the gNB by taking the power difference between the maximal UE TX power and the UE power head room (PHR), wherein both of them can be extracted form a UE PHR report, which is carried by the same PUSCH.

Figure 1B:
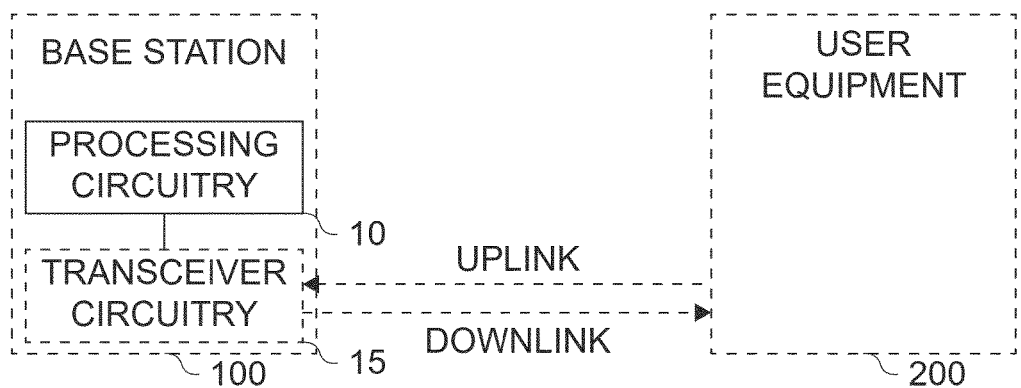
Figure 2A:
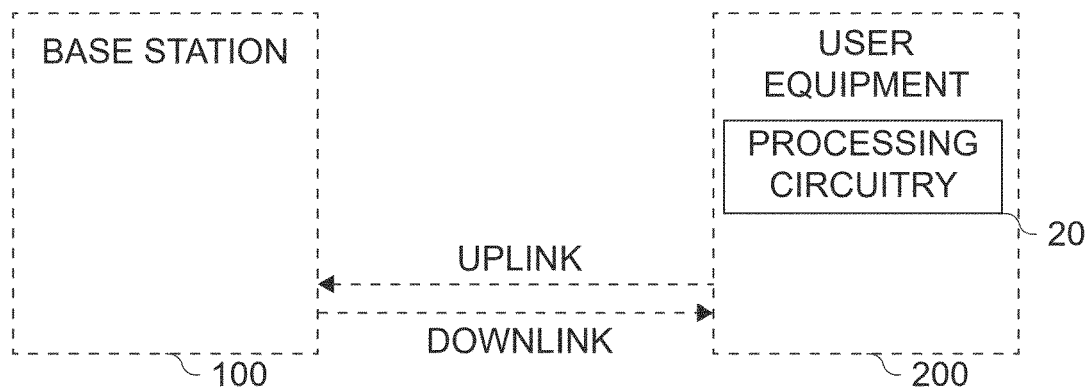
FIGS. 2a and 2b show block diagrams of examples of processing circuitry or processing means for a user equipment.

FIGS. 1a and 1b show block diagrams of examples of processing circuitry 10 or processing means 10 for a base station 100. FIGS. 1a and 1b further show a base station 100 comprising such processing circuitry 10 or processing means 10. For example, the processing circuitry, such as a processor, may be used to implement the processing means. The processing means may thus be functionally equivalent to the processing circuitry. In some examples, as shown in FIG. 1b, the base station may further comprise transceiver circuitry 15 (i.e. means for transceiving) for transmitting wireless signals to, and/or receiving wireless signals from, a user equipment 200, e.g. a user equipment as shown in FIGS. 2a and/or 2b.

The processing circuitry is configured to select one of a first uplink beamforming management mode and a second uplink beamforming mode for a beamformed uplink communication between a user equipment and the base station. The selection is based on a path loss on a first wireless channel between the base station and the user equipment and based on a path loss on a second wireless channel between the user equipment and the base station. The processing circuitry is configured to provide an instruction related to the selection of the first or second uplink beamforming management mode to the user equipment.

Figure 1C:
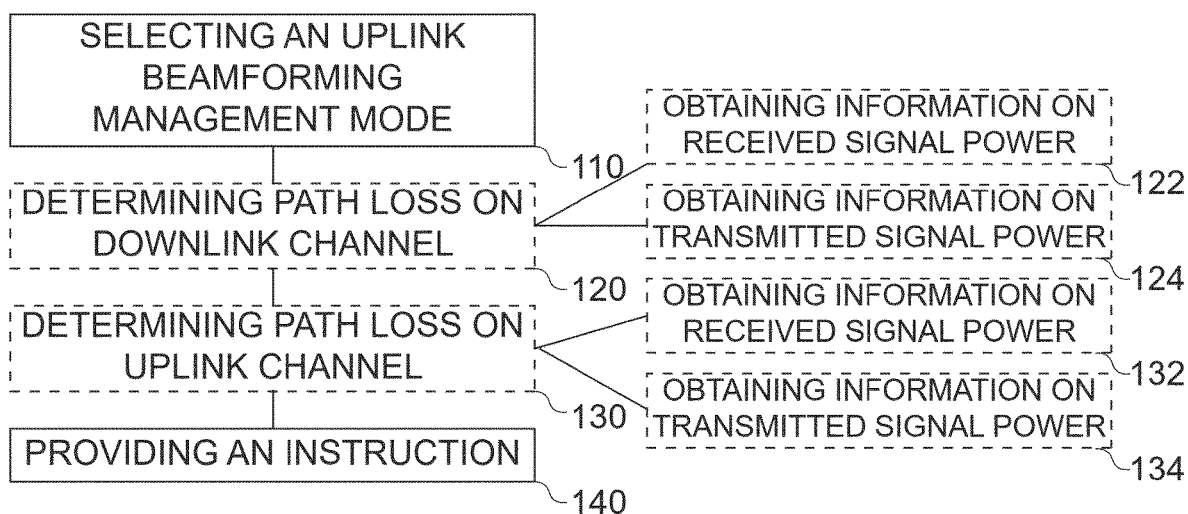
FIG. 1c shows a flow chart of an example of a method for a base station.

FIG. 1c shows a flow chart of an example of a corresponding method for a base station. The method comprises selecting 110 one of a first uplink beamforming management mode and a second uplink beamforming model for a beamformed uplink communication between a user equipment and the base station. The selection is based on a path loss on a first wireless channel between the base station and the user equipment and based on a path loss on a second wireless channel between the user equipment and the base station. The method comprises providing 140 an instruction related to the selection of the first or second uplink beamforming management mode to the user equipment.

The following description relates to the processing circuitry 10/processing means 10 of FIGS. 1a and/or 1b, and to the corresponding method of FIG. 1c. Features that are introduced in the context of the application, e.g. in the context of the processing circuitry 10/processing means 10, may readily be applied to the corresponding method.

The examples shown in connection with FIGS. 1a to 1c relate to processing circuitry/processing means, a method and a computer program for a base station, which implement a selection of an uplink beamforming management mode for a user equipment. In general, the base station and the user equipment may communicate via a mobile communication system, e.g. using protocols, frequency resources etc. of a mobile communication system. As has been pointed out before, in some system, a static assignment of the first uplink beamforming management mode or the second uplink beamforming management mode is performed, based on the (hardware) capabilities of the user equipment. Examples, however, provide an approach that assigns one of the first and second uplink beamforming management mode based on the properties of the wireless channel between the base station and the user equipment.

In general, the wireless channel between the base station and the user equipment may behave differently, depending on whether the base station or the user equipment is the entity transmitting a wireless signal via the wireless channel. For example, this may be due to reflective surfaces that influence the wireless channel. In many cases, however, the wireless channel may be similar enough that (approximate) reciprocity of the channel may be assumed. In general, a wireless channel between the base station and the user equipment (and vice versa) may be considered reciprocal, if a wireless transmission transmitted from the base station to the user equipment (on the first wireless channel) behaves the same as a wireless transmission transmitted from the user equipment to the base station (on the second wireless channel). In the terms of this disclosure, the term "reciprocal channel", however, does not relate to a wireless channel that has to behave exactly the same from both ends, it may be sufficient that the wireless channel behaves substantially or sufficiently similar for both the base station and the user equipment. In other words, the wireless channel may be considered reciprocal, if a transfer function of a wireless signal transmitted from the base station to the user equipment differs by at most 10% (or at most 5%, at most 2%), e.g. in amplitude, or in terms of reflections, from a corresponding wireless signal transmitted from the user equipment to the base station.

This assumption of reciprocity may underlie the first uplink beamforming management mode. For example, the first uplink beamforming management mode may be a reciprocity-based uplink beamforming management mode. In other words, the first uplink beamforming management mode (i.e. the reciprocity-based uplink beamforming management mode) may be based on an assumption of a substantially reciprocal wireless channel between the base station and the user equipment. For example, this may be the case if the first and the second wireless channel behave the same. This may enable a re-use of beamforming parameters that are determined by the base station at the user equipment. In other words, the user equipment may derive the beamforming parameters for the uplink communication to the base station from the beamforming parameters for the downlink communication from the base station to the user equipment.

The second uplink beamforming management mode, however, may be a uplink beamforming management mode that does not rely on the reciprocity of the wireless channel, e.g. as the wireless channel is not reciprocal, or as the reciprocity of the wireless channel is not apparent to the base station or the user equipment. Instead, the second uplink beamforming management mode may require the user equipment to perform its own determination of the uplink beamforming parameters. In other words, the second uplink beamforming management mode may be an uplink beamforming management mode that is based on beam sweeping of the user equipment. For example, in a 5G mobile communication system, the second uplink beamforming management mode may be an uplink beamforming management mode that is based on Sounding Reference Signal, SRS, based transmission beam sweeping. To sum it up, the second uplink beamforming management mode may be an uplink beamforming management mode that does not rely on the reciprocity of the wireless channel, and requires the user equipment to perform beam sweeping in order to determine the beamforming parameters for uplink communications (to the base station) of the user equipment.

In general, the wireless channel between the base station and the user equipment may behave differently in different scenarios. For example, wireless propagation properties of wireless transmissions in different frequency ranges may behave differently. At high carrier frequencies, beamforming may beneficial, as it can be used to counteract the effects of the more pronounced attenuation at the higher carrier frequencies, providing gains that enable communication over larger distances. For example, the beamformed uplink communication of the user equipment may be conducted at a carrier frequency of at least 20 GHz. For example, the above-mentioned FR2 frequency range starts at 25 GHz. In some examples, the approaches chosen may also be used at lower frequencies, e.g. in FR1 at carrier frequencies of up to 6 GHz.

The processing circuitry is configured to select one of the first uplink beamforming management mode and the second uplink beamforming mode for the beamformed uplink communication between the user equipment and the base station (i.e. from the user equipment to the base station). More precisely, the processing circuitry may be configured to select either the first or the second uplink beamforming management mode for the beamformed uplink communication between the user equipment and the base station. In other words, the selected first or second uplink beamforming management mode may be used, by the user equipment, in order to determine beamforming parameters for the uplink communication from the user equipment to the base station. To clarify, in the context of this application, the terms "uplink" and "uplink communication" are used for a communication from the user equipment to the base station (i.e. wireless transmission from the user equipment to the base station), and the term "downlink" and "downlink communication" is used for a communication from the base station to the user equipment (i.e. wireless transmissions from the base station to the user equipment).

The selection is based on a path loss on a first wireless channel between the base station and the user equipment (also referred to as "wireless downlink channel" or "downlink channel") and based on a path loss on a second wireless channel between the user equipment and the base station (also referred to as "wireless uplink channel" or "uplink channel"). For example, the path loss on the downlink channel and the path loss on the uplink channel may be used in order to determine whether the wireless channel is reciprocal, i.e. behaves similarly for downlink and uplink communication. In other words, the processing circuitry may be configured to determine whether the wireless channel is (sufficiently or substantially) reciprocal based on the path loss on the downlink channel and the path loss on the uplink channel. For example, the processing circuitry may be configured to compare the path loss on the downlink channel with the path loss on the uplink channel, and determine that the wireless channel is deemed reciprocal if the difference between the path loss on the uplink channel and the path loss on the downlink channel is at most 10% (or at most 5%, at most 2%, at most 1%) of the path loss on the downlink channel (or the path loss on the downlink channel). In some examples, the processing circuitry may be configured to compare a difference between the path loss on the downlink channel and the path loss on the uplink channel to a threshold, and select one of the first or the second uplink beamforming management mode if the difference (or an absolute value of the difference) is greater than the threshold, and to select the other if the if the difference (or an absolute value of the difference) is at most the threshold.

In this context, the term "path loss on the downlink/uplink channel" is used, which may correspond to a "path loss a wireless signal incurs on the downlink/uplink channel". In general, the path loss may relate to a non-beamformed wireless signal. In some examples, however, the path loss may relate to a beamformed wireless signal that uses reciprocal beamforming parameters. Also, the path loss may be incurred at a certain carrier frequency, e.g. at a carrier frequency of at least 20 GHz.

In some examples, the processing circuitry may be configured to obtain information on the path loss on the downlink channel and/or information on the path loss on the uplink channel form another entity, e.g. from the transceiver circuitry of the base station, or from the user equipment. In some examples, however, the processing circuitry may be configured to determine (i.e. calculate and/or measure) the path loss on the downlink channel and/or the path loss on the uplink channel.

For example, the processing circuitry may be configured to determine the path loss on the first wireless channel between the base station and the user equipment (i.e. the downlink channel). Accordingly, the method may comprise determining 120 the path loss on the first wireless channel between the base station and the user equipment.

For example, this may be achieved by transmitting a reference signal, and by obtaining information on a measurement of the downlink reference signal, the measurement being performed by the user equipment. In other words, the processing circuitry may be configured to affect the transmission of a downlink reference signal. Accordingly, the method may comprise affecting the transmission of the downlink reference signal. For example, the processing circuitry may be configured to instruct the transceiver circuitry to transmit the downlink reference signal. For example, the downlink reference signal may be one of a Synchronization Signal Block, SSB, and a Channel State Information Reference Signal, CSI-RS (e.g. in 5G mobile communication systems).

After the transmission of the downlink reference signal, the user equipment may supply information on the received downlink reference signal. Accordingly, the processing circuitry may be configured to obtain 122 information on a received signal power of the downlink reference signal from the user equipment. For example, the information on the received signal power may be obtained as a part of a Layer 1-Reference Signal Received Power report, L1-RSRP, of the user equipment. To obtain the information on the received signal power from the user equipment, the processing module may be configured to request the information on the received signal power from the user equipment, e.g. by affecting the transmission of the downlink reference signal or by providing a request for the information on the received signal power to the user equipment.

The processing circuitry may be further configured to determine 120 the path loss on the first wireless channel between the base station and the user equipment based on the received signal power of the downlink reference signal and based on a transmitted signal power of the downlink reference signal. Accordingly, the processing module may be configured to obtain 124 information on the transmitted signal power of the downlink reference signal, e.g. from the transceiver circuitry. The processing circuitry may be configured to determine the path loss on the downlink channel based on a difference between the transmitted signal power and the received signal power of the downlink reference signal, e.g. by determining a ratio between the transmitted signal power and the received signal power of the downlink reference signal, or by determining an absolute difference between the transmitted signal power and the received signal power of the downlink reference signal.

Likewise, the processing circuitry may be configured to determine the path loss on the uplink channel. In other words, the processing circuitry may be configured to determine 130 the path loss on the second wireless channel between the user equipment and the base station. In this case, the user equipment may provide an uplink reference signal, and the base station may provide the received signal power of the uplink reference signal. Accordingly, the processing module may be configured to request the transmission of the uplink reference signal from the user equipment, e.g. by transmitting a request relating to the transmission of the uplink reference signal to the user equipment. In various examples, the uplink reference signal may be an uplink demodulation reference signal. For example, the uplink demodulation reference signal may be a demodulation reference signal, DMRS, transmitted on a physical uplink shared channel, PUSCH, between the user equipment and the base station.

After the uplink reference signal is received by the base station, the processing circuitry may obtain the transmitted and received signal power of the uplink reference signal. For example, the processing circuitry may be configured to obtain 132 information on a received signal power of the uplink reference signal transmitted by the user equipment, e.g. from the transceiver circuitry of the base station, or by measuring the received signal power of the uplink reference signal using the transceiver circuitry of the base station. In other words, the information on the received signal power of the uplink reference signal may be based on a measurement performed by the base station. Accordingly, the processing circuitry may be configured to determine the path loss on the second wireless channel between the user equipment and the base station based on a received signal power of the uplink reference signal.

Furthermore, the processing circuitry may be configured to obtain 134 information on the transmitted signal power of the uplink reference signal transmitted by the user equipment, e.g. by obtaining the information on the transmitted signal power from the user equipment, or by assuming a fixed signal power that is used by the user equipment for uplink reference signals. The information on the transmitted signal power of the uplink reference signal may be transmitted (and received by the base station) over the same physical uplink channel as the uplink demodulation reference signal. For example, the information on the transmitted signal power may comprise information on a power head room (PHR) for the transmission of the uplink reference signal and information on a maximal user equipment transmission power. The processing circuitry may be configured to determine 134 the transmission power of the uplink reference signal based on the power head room and based on the maximal user equipment transmission power (e.g. by subtracting the power head room from the maximal user equipment transmission power).

The path loss on the second wireless channel between the user equipment and the base station may be based on the received signal power of the uplink reference signal and based on the transmitted signal power of the uplink reference signal. As in the case of the path loss on the downlink channel, the processing circuitry may be configured to determine the path loss on the uplink channel based on a difference between the transmitted signal power and the received signal power of the uplink reference signal, e.g. by determining a ratio between the transmitted signal power and the received signal power of the uplink reference signal, or by determining an absolute difference between the transmitted signal power and the received signal power of the uplink reference signal.

The processing circuitry is configured to provide the instruction related to the selection of the first or second uplink beamforming management mode to the user equipment. For example, the instruction related to the selection of the first or second uplink beamforming management mode may instruct the user equipment to use either the first or the second uplink beamforming management mode. For example, the processing circuitry may be configured to provide the instruction related to the selection of the first or second uplink beamforming management mode via a downlink control channel of the mobile communication system. In some examples, the processing circuitry may be configured to provide beamforming parameters related to the first uplink beamforming management mode to the user equipment. In some examples, this may comprise affecting the transmission of a spatial downlink reference signal that the user equipment can reuse for the uplink beamforming parameters (i.e. the beam forming pattern).

A base station may correspond to a remote radio head, a transmission point, an access point, radio equipment, a macro cell, a small cell, a micro cell, a femto cell, a metro cell etc. A base station may correspond to a base station understood as a logical concept of a node/entity terminating a radio bearer or connectivity over the air interface between a terminal/mobile transceiver and a radio access network. A base station can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station may correspond to a NodeB, an eNodeB, a gNodeB, a Base Transceiver Station (BTS), an access point, a remote radio head, a transmission point, a relay transceiver etc., which may be further subdivided in a remote unit and a central unit.

The user equipment, which may also be denoted user device, mobile device, mobile transceiver etc., may be a mobile communication equipment being operated by a user of the mobile communication system. For example, the user equipment may be one of a cellular phone, a smartphone, a wearable device, a smartwatch, a cellular-capable sensor, an Internet-of-Things-device, a vehicle, a portable computer, a laptop computer, a tablet computer etc.

In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a 5G New Radio system, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In examples the processing circuitry or processing means 10 may be implemented using one or more processing units, one or more processing devices, any means for processing, such as a processor, a computer or a programmable hardware component being operable with accordingly adapted software. In other words, the described function of the processing circuitry or processing means 10 may as well be implemented in software, which is then executed on one or more programmable hardware components. Such hardware components may comprise a general-purpose processor, a Digital Signal Processor (DSP), a micro-controller, etc. The processing circuitry/means is coupled to the transceiver circuitry/means.

The transceiver means/transceiver circuitry 15 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the transceiver means/transceiver circuitry 15 may be configured to communicate using mmWave wireless communication.

Figure 2B:
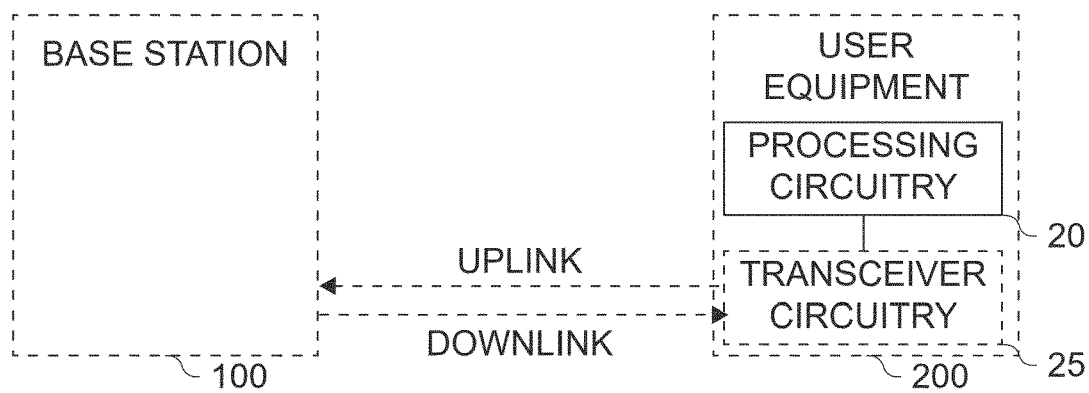

FIGS. 2a and 2b show block diagrams of examples of processing circuitry 20 or processing means 20 for a user equipment 200. FIGS. 2a and 2b further show a user equipment 200 comprising such processing circuitry 20 or processing means 20. For example, the processing circuitry, such as a processor, may be used to implement the processing means. The processing means may thus be functionally equivalent to the processing circuitry. In some examples, as shown in FIG. 2b, the base station may further comprise transceiver circuitry 25 (i.e. means for transceiving) for transmitting wireless signals to, and/or receiving wireless signals from, a base station 100, e.g. a base station as shown in FIGS. 1a and/or 1b.

The processing circuitry is configured to obtain an instruction related to a selection of a first or a second uplink beamforming management mode for a beamformed uplink communication between the user equipment and a base station from the base station. The selection is based on a path loss on a first wireless channel between the base station and the user equipment and based on a path loss on a second wireless channel between the user equipment and the base station. The processing circuitry is configured to use the first uplink beamforming management mode or the second uplink beamforming management mode for the beamformed uplink communication based on the instruction related to the selection.

Figure 2C:
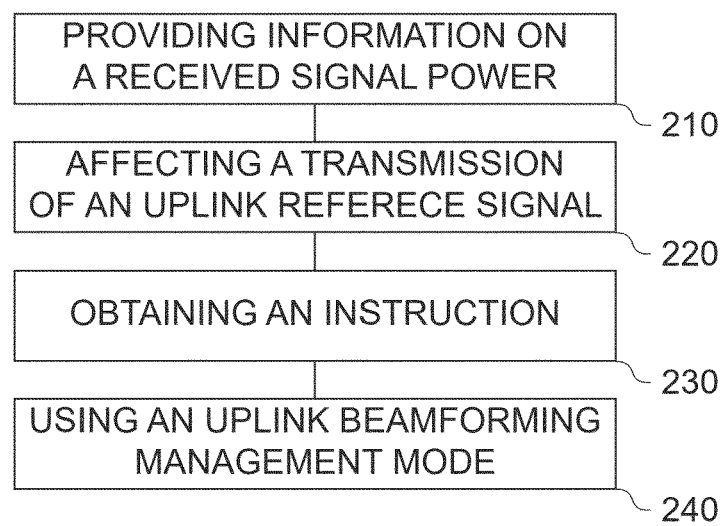
FIG. 2c shows a flow chart of an example of a method for a user equipment.

FIG. 2c shows a flow chart of an example of a corresponding method for a user equipment. The method comprises obtaining 230 an instruction related to a selection of a first or a second uplink beamforming management mode for a beamformed uplink communication between the user equipment and a base station from the base station. The selection is based on a path loss on a first wireless channel between the base station and the user equipment and based on a path loss on a second wireless channel between the user equipment and the base station. The method comprises using 240 the first uplink beamforming management mode or the second uplink beamforming management mode for the beamformed uplink communication based on the instruction related to the selection.

The following description relates to the processing circuitry 20/processing means 20 of FIGS. 2a and/or 2b, and to the corresponding method of FIG. 2c. Features that are introduced in the context of the application, e.g. in the context of the processing circuitry 20/processing means 20, may readily be applied to the corresponding method.

While FIGS. 1a to 1c relate to a base station of the mobile communication system, FIGS. 2a to 2c may relate to the corresponding user equipment 200. Examples thus provide processing circuitry/processing means, a method and a computer program for a user equipment 200. While the base station performs the selection of the uplink beamforming management mode, the user equipment configures itself according to the selection, and may optionally provide information or reference signals to aid in the selection of the uplink beamforming management mode.

The processing circuitry is configured to obtain the instruction related to a selection of a first or a second uplink beamforming management mode for a beamformed uplink communication between the user equipment and a base station from the base station. For example, the instruction related to the selection of the first or second uplink beamforming management mode may instruct the user equipment, e.g. the processing circuitry, to use either the first or the second uplink beamforming management mode. For example, the processing circuitry may be configured to obtain the instruction related to the selection of the first or second uplink beamforming management mode via a downlink control channel of the mobile communication system, e.g. via transceiver circuitry/means for transceiving of the user equipment. In some examples, the processing circuitry may be configured to obtain beamforming parameters related to the first uplink beamforming management mode from the base station. In some examples, this may comprise evaluating a transmission of a spatial downlink reference signal by the base station. The processing circuitry may be configured to derive the uplink beam forming parameters (i.e. the beam forming pattern) based on the received spatial downlink reference signal, e.g. by determining the directionality of the spatial downlink reference signal.

The selection is based on a path loss on a first wireless channel between the base station and the user equipment and based on a path loss on a second wireless channel between the user equipment and the base station. For example, the selection may be based on the criteria and factors laid out in connection with FIGS. 1a to 1c.

Accordingly, the user equipment may aid in the selection of the uplink beamforming management mode. For examples, the processing circuitry may be configured to provide 210 information on a received signal power of a downlink reference signal to the base station. For example, the processing circuitry may be configured to measure the received signal power of the downlink reference signal using the transceiver circuitry of the user equipment, or the processing circuitry may be configured to obtain the information on the received signal power from the transceiver circuitry. In this case, the transceiver circuitry may perform the measurement. Some examples may reuse existing reference signals and/or signaling to determine the path loss on the downlink channel. For example, the information on the received signal power may be provided as a part of a Layer 1-Reference Signal Received Power report, L1-RSRP. The downlink reference signal may be one of a Synchronization Signal Block, SSB, and a Channel state information Reference Signal, CSI-RS. The selection (of the uplink beamforming management mode) may be based on the provided information on the received signal power.

Additionally, the user equipment may transmit an uplink reference signal, e.g. to aid in the determination of the path loss on the uplink channel. For example, the processing circuitry may be configured to affect 220 a transmission of an uplink reference signal to the base station (e.g. by instructing the transceiver circuitry to transmit the uplink reference signal). The selection may be based on the transmitted uplink reference signal. For example, the uplink reference signal may be an uplink demodulation reference signal, e.g. a DMRS. The uplink demodulation reference signal may be transmitted on a physical uplink shared channel, PUSCH, between the user equipment and the base station. The processing circuitry may be configured to further provide information on a transmitted signal power of the uplink reference signal to the base station. The information on the transmitted signal power of the uplink reference signal may be transmitted over the same physical uplink channel as the uplink demodulation reference signal, e.g. over the PUSCH. For example, the information on the transmitted signal power may comprise information on a power head room (PHR) for the transmission of the uplink reference signal and information on a maximal user equipment transmission power.

The information on the transmitted signal power may be transmitted using (e.g. within, by) a power head room report. In some examples, the base station may request the transmission of the uplink reference signal. The processing circuitry may be configured to obtain a request for the uplink reference signal from the base station, and to affect the transmission of the uplink reference signal (and optionally the provision of the information of the transmitted signal power) based on the request.

The processing circuitry is configured to use the first uplink beamforming management mode or the second uplink beamforming management mode for the beamformed uplink communication based on the instruction related to the selection, e.g. to either user the first or the second uplink beamforming management mode based on the selection performed by the base station. In case of the first uplink beamforming management mode, the processing circuitry may be configured to use beamforming parameters derived from a spatial reference signal for the beamformed uplink communication of the user equipment. For example, the processing circuitry may be configured to control the transceiver circuitry to use the beamforming parameters derived from a spatial reference signal for the beamformed uplink communication of the user equipment. In case of the second uplink beamforming management mode, the processing circuitry may be configured to perform beam sweeping to determine the beamforming parameters to use for the beamformed uplink communication of the user equipment. For example, the processing circuitry may be configured to instruct the transceiver circuitry to perform the beam sweeping. For example the beam sweeping may be Sounding Reference Signal, SRS, based transmission beam sweeping.

In examples the processing circuitry or processing means 20 may be implemented using one or more processing units, one or more processing devices, any means for processing, such as a processor, a computer or a programmable hardware component being operable with accordingly adapted software. In other words, the described function of the processing circuitry or processing means 20 may as well be implemented in software, which is then executed on one or more programmable hardware components. Such hardware components may comprise a general-purpose processor, a Digital Signal Processor (DSP), a micro-controller, etc. The processing circuitry/means is coupled to the transceiver circuitry/means.

The transceiver means/transceiver circuitry 25 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the transceiver means/ transceiver circuitry 25 may be configured to communicate using mmWave wireless communication.

More details and aspects of the user equipment, processing circuitry, processing means and method are mentioned in connection with the proposed concept or one or more examples described above or below (e.g. FIG. 1a to 1c, 3a to 7). The user equipment, processing circuitry, processing means and method may comprise one or more additional optional features corresponding to one or more aspects of the proposed concept or one or more examples described above or below.

At least some examples of the present disclosure may relate to a computer program that implements at least one of the methods or apparatuses shown in connection with FIGS. 1a to 2c. Examples may provide a machine readable storage medium including program code, when executed, to cause a machine to perform one of the above methods. Examples may relate to a computer program having a program code for performing one of the above methods, when the computer program is executed on a computer, a processor, or a programmable hardware component. Some examples may relate to a machine readable storage including machine readable instructions, when executed, to implement a method or realize an apparatus as claimed in any pending claim.

More details and aspects of the computer program are mentioned in connection with the proposed concept or one or more examples described above or below (e.g. FIG. 1a to 2c, 3a to 7). The computer program may comprise one or more additional optional features corresponding to one or more aspects of the proposed concept or one or more examples described above or below.

In the following, a more detailed example is shown, which is based on the 5G NR mobile communication system.

For uplink beam management for 5G NR mmWave band operations, two alternative UL BM (beam management) modes may be utilized by a 5G base station (gNB, e.g. the base station), wherein the first alternative UL BM mode (i.e. the first uplink beamforming management mode) makes use of channel reciprocity and directly reuses the DL BM results for UL beamforming. On the other hand, the second alternative UL BM mode (i.e. the second uplink beamforming management mode) may re-require a UL beam pair between a UE TX and a gNB RX by triggering SRS based UE TX beam sweeping. The second UL BM mode might not rely on channel reciprocity but may have a higher spectrum overhead due to extra SRS bursts. In order to improve the trade-off between UL link performance and spectrum overhead, examples provide a method to run-time evaluate the channel reciprocity between UL and DL, and then accordingly select the UL BM mode in gNB side based on the channel reciprocity evaluation. The proposed approach/method may be be realized within a 5G base station (e.g. by the processing circuitry 10 of the base station 100), without needing to change the current 3GPP standard.

Figure 3A:
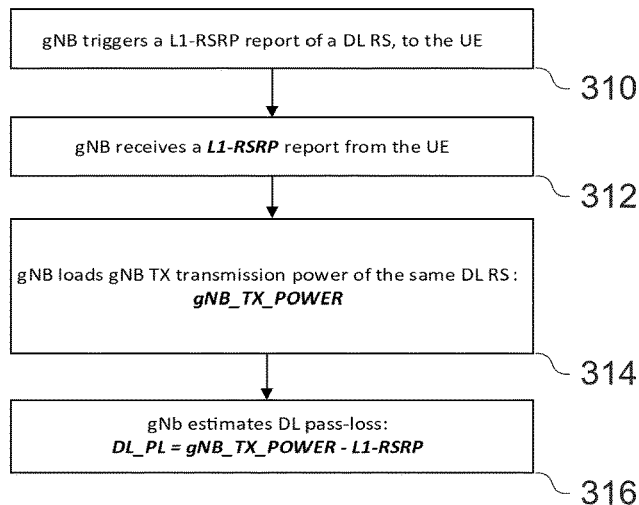
FIG. 3a shows a schematic diagram of an example of a procedure for determining a downlink path loss.

In some examples, a 5G base station may run-time compare a UL PL (path loss) and a DL PL (path loss), so as to run-time check the channel reciprocity, between a DL channel and a UL channel with a served UE. When channel reciprocity holds (meaning similar UL PL and DL PL), the UL BM mode 1, which reuses the DL BM results for UL beamforming, could be selected by the gNB. When channel reciprocity does not hold (meaning different UL PL and DL PL), the UL BM mode 2, which triggers extra SRS based UE TX beam sweeping, could be selected by the gNB. The key of some examples may lie in how a gNB may determine a DL PL (UL) and a UL PL (path loss), by using the current 3GPP NR standard. The proposed features are shown below:

First, the DL PL could be determined by the gNB, by triggering a L1-RSRP report of a DL RS, and then computing the power difference between the gNB transmission power of the DL RS (SSB/CSI-RS), and the UE reported L1-RSRP of the same DL RS. FIG. 3a shows one example gNB procedure (of determining a DL PL by a gNB) of the proposed method. The gNB may trigger 310 a L1-RSRP report of a DL RS, to the UE, receive 312 the L1-RSRP report from the user equipment, load 314 the gNB TX transmission power gNB TX POWER of the same DL RS, and estimate 316 the DL path loss DL_PL=gNB_TX_POWER−L1-RSRP.

Figure 3B:
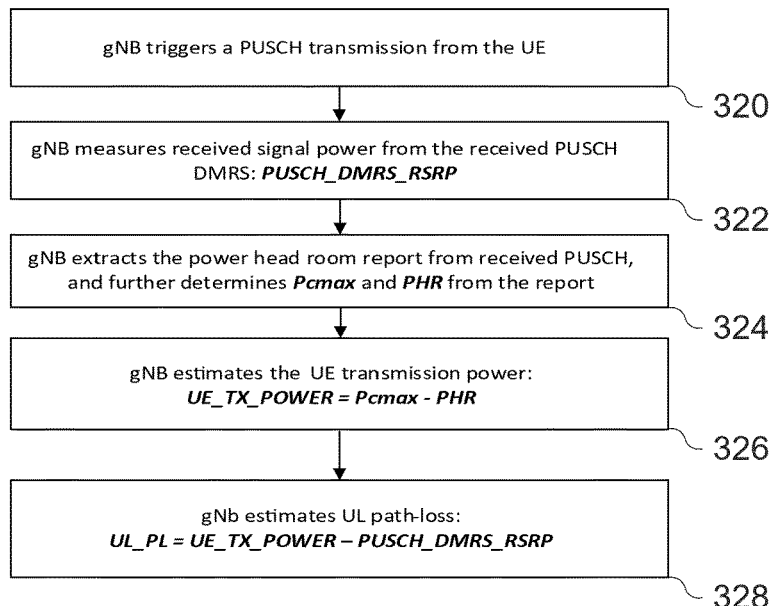
FIG. 3b shows a schematic diagram of an example of a procedure for determining an uplink path loss.

Second, the UL PL may be determined by the gNB, by taking a UL RSRP measurement of a received PUSCH DMRS, and then computing the power difference between the measured PUSCH DMRS RSRP, and the UE transmission power of the PUSCH DMRS. In particular, the UE transmission power of the PUSCH DMRS may be further determined by gNB by taking the power difference between the maximal UE TX power and the UE power head room (PHR), wherein both of them can be extracted form a UE PHR report, which is carried by the same PUSCH. FIG. 3b shows one example gNB procedure (of determining a UL PL) of the proposed approach/method. The gNB may trigger 320 a PUSCH transmission from the UE, measure 322 a received signal power from the received PUSCH DMRS (PUSCH_DMRS_RSRP), extract 324 the power head room report from the received PUSCH, and determine 326 Pcmax (i.e. the maximal transmission power of the user equipment) and the PHR from the report, estimates the UE transmission power (UE_RX_POWER=Pcmax−PHR) and estimate 328 the path loss UL_PL=UE_TX_POWER−PUSCH_DMRS_RSRP.

Alternatively, the UL PL may be determined first, and then the DL PL, or both at the same time.

Upon having measured (or estimated) both UL PL and DL PL, the gNB may further evaluate the run-time channel reciprocity by comparing the difference between the UL PL and the DL PL with a pre-defined threshold, and then dynamically select the UL BM modes.

Figure 3C:
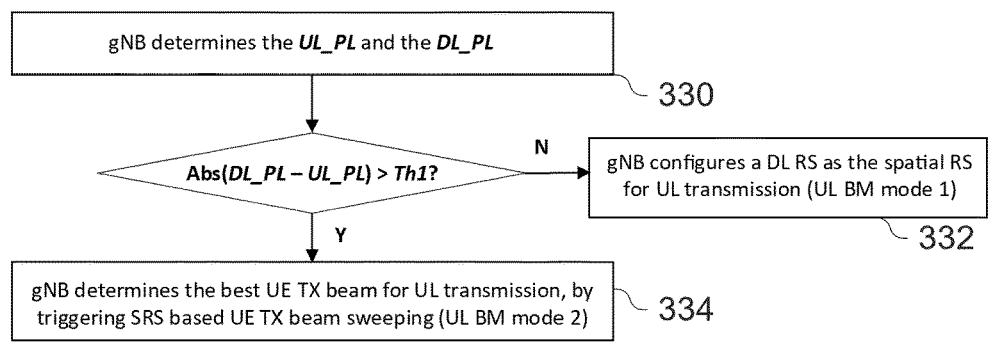
FIG. 3c shows a schematic diagram of an example of a procedure for selecting an uplink beam-forming mode.

FIG. 3c shows an example gNB procedure (or UL BM mode selection by run-time channel reciprocity evaluation) of the proposed approach/method. The gNB may determine 330 the UL_PL and the DL_PL, if an absolute value of the difference between DL_PL and UL_PL is larger than a threshold TH1, the gNB may determine 334 the best UE TX beam for UL transmission, by triggering SRS based UE TX beam sweeping (UL BM mode 2), if not, the gNB may configure 332 a DL RS as the spatial RS for UL transmission (UL BM mode 1).

The approach/method may be realized within base station PHY controller. In other words, the processing circuitry may be part of the base station PHY controller.

More details and aspects of the concept are mentioned in connection with the proposed concept or one or more examples described above or below (e.g. FIG. 1a to 2c, 4 to 7). The concept may comprise one or more additional optional features corresponding to one or more aspects of the proposed concept or one or more examples described above or below.

Figure 4:
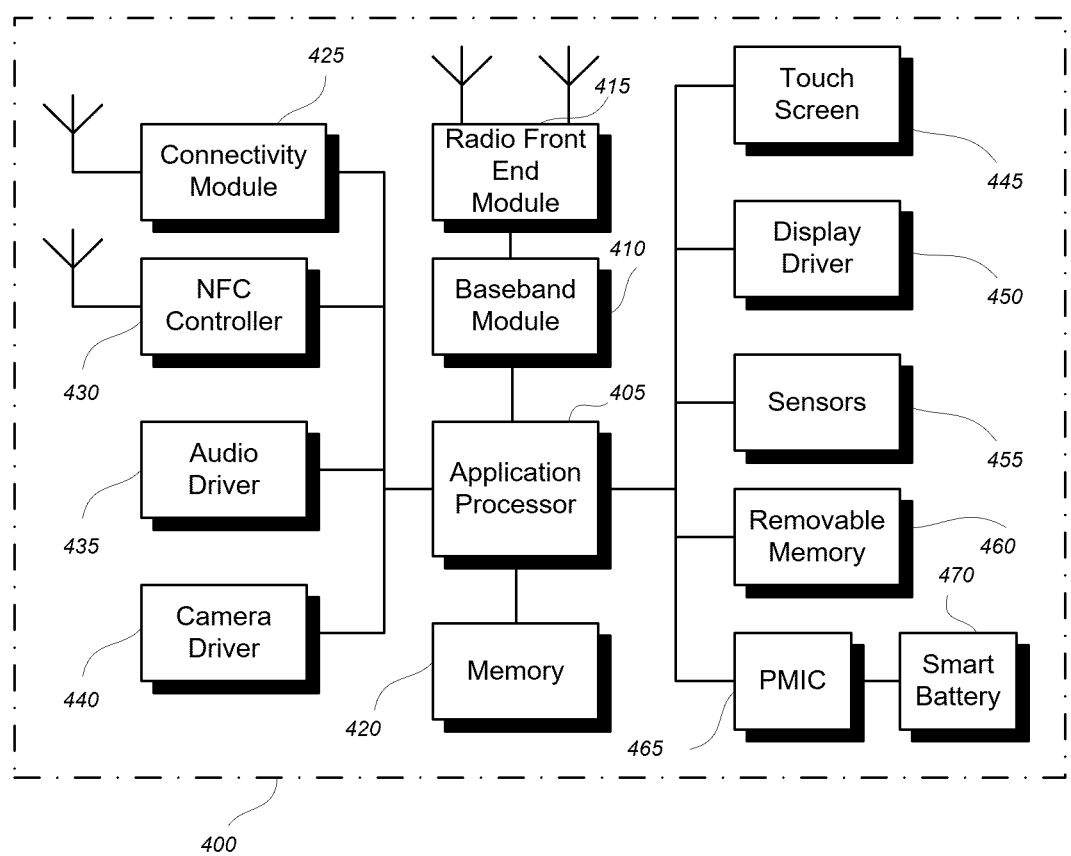
FIG. 4 illustrates a user device or user equipment.

FIG. 4 illustrates a user device 400 in accordance with an aspect. For example, the user device 400 may correspond to the user equipment 200 of FIGS. 1a to 3c. The user device 400 may be a mobile device in some aspects and includes an application processor 405, baseband processor 410 (also referred to as a baseband module, e.g. the processing circuitry 20), radio front end module (RFEM) 415 (e.g. the transceiver circuitry 25), memory 420, connectivity module 425, near field communication (NFC) controller 430, audio driver 435, camera driver 440, touch screen 445, display driver 450, sensors 455, removable memory 460, power management integrated circuit (PMIC) 465 and smart battery 470.

In some aspects, application processor 405 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (TO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 410 may be implemented, for example, as a solder-down substrate including one or more integrated circuits, a single packaged integrated circuit soldered to a main circuit board, and/or a multi-chip module containing two or more integrated circuits.

Figure 5:
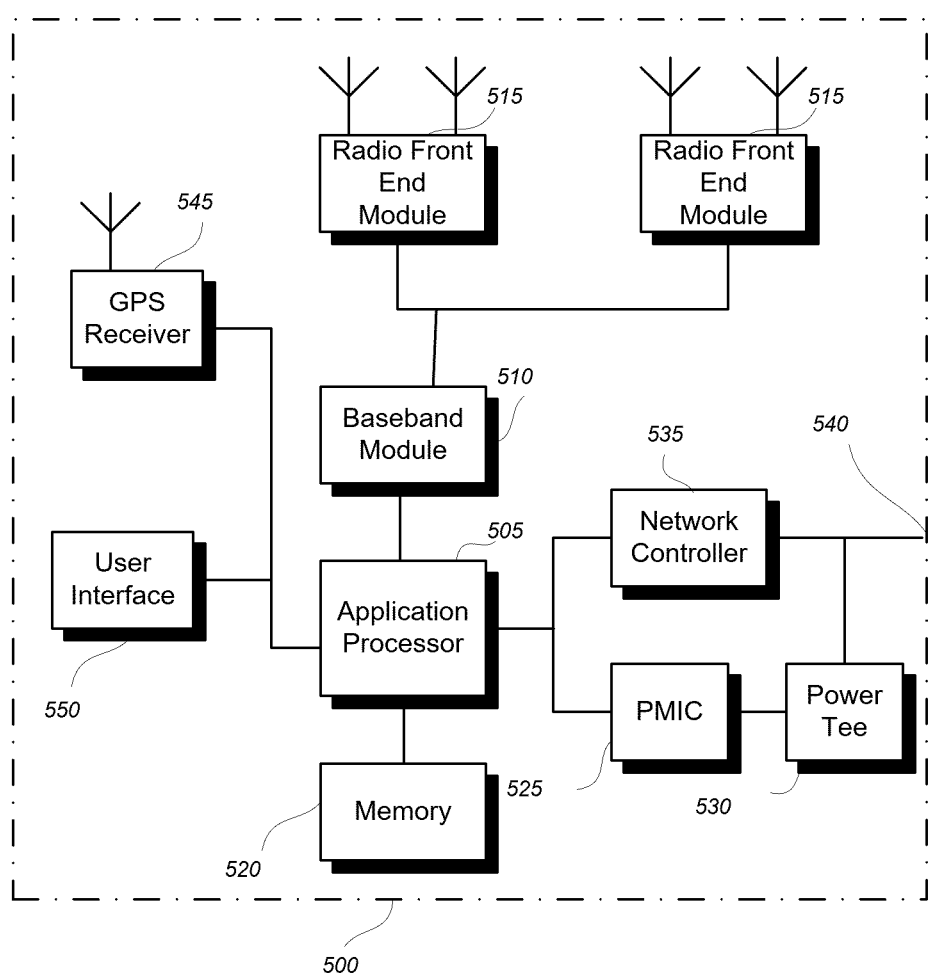
FIG. 5 illustrates a base station or infrastructure equipment radio head.

FIG. 5 illustrates a base station or infrastructure equipment radio head 500 (e.g. the base station 100 of FIGS. 1a to 3c) in accordance with an aspect. The base station radio head 500 may include one or more of application processor 505 (e.g. the processing circuitry 10), baseband modules 510 (e.g. the processing circuitry 10), one or more radio front end modules 515 (e.g. the transceiver circuitry 15), memory 520, power management circuitry 525, power tee circuitry 530, network controller 535, network interface connector 540, satellite navigation receiver module 545, and user interface 550.

In some aspects, application processor 505 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 510 may be implemented, for example, as a solder-down substrate including one or more integrated circuits, a single packaged integrated circuit soldered to a main circuit board or a multi-chip module containing two or more integrated circuits.

In some aspects, memory 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 520 may be implemented as one or more of solder down packaged integrated circuits, socketed memory modules and plug-in memory cards.

In some aspects, power management integrated circuitry 525 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 530 may provide for electrical power drawn from a network cable to provide both power supply and data connectivity to the base station radio head 500 using a single cable.

In some aspects, network controller 535 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 545 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 545 may provide data to application processor 505 which may include one or more of position data or time data. Application processor 505 may use time data to synchronize operations with other radio base stations.

In some aspects, user interface 550 may include one or more of physical or virtual buttons, such as a reset button, one or more indicators such as light emitting diodes (LEDs) and a display screen.

Figures 6A, 6B:
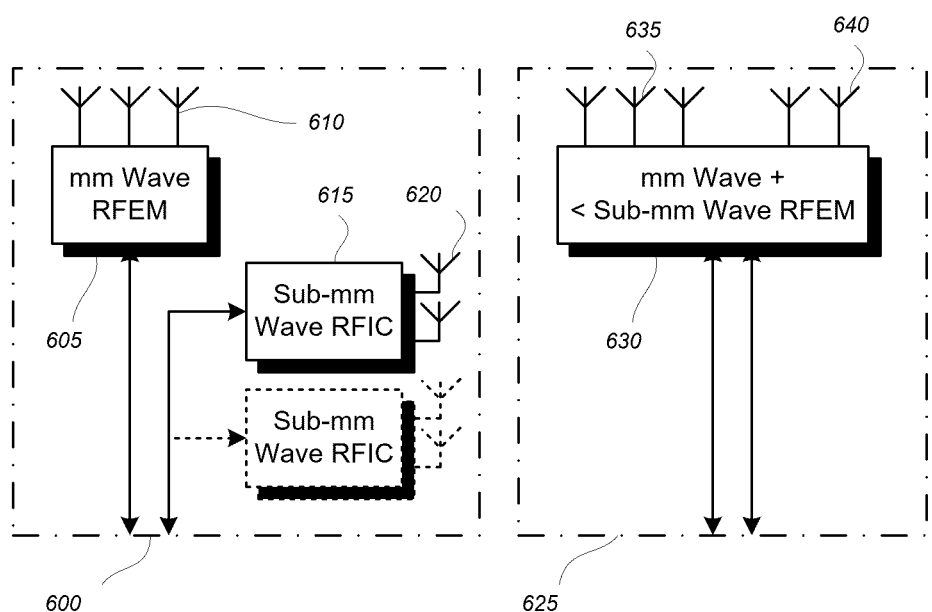
FIGS. 6a and 6b illustrate aspects of a radio front end module.

FIG. 6A and FIG. 6B illustrate aspects of a radio front end module.

FIG. 6A illustrates an aspect of a radio front end module 600 (e.g. the transceiver circuitry 15; 25) incorporating a millimeter wave radio front end module (RFEM) 605 and one or more sub-millimeter wave radio frequency integrated circuits (RFIC) 615. In this aspect, the one or more sub-millimeter wave RFICs 615 may be physically separated from a millimeter wave RFEM 605. RFICs 615 may include connection to one or more antennas 620. RFEM 605 may be connected to multiple antennas 610.

FIG. 6B illustrates an alternate aspect of a radio front end module 625. In this aspect both millimeter wave and sub-millimeter wave radio functions may be implemented in the same physical radio front end module 630. RFEM 630 may incorporate both millimeter wave antennas 635 and sub-millimeter wave antennas 640.

Figure 7:
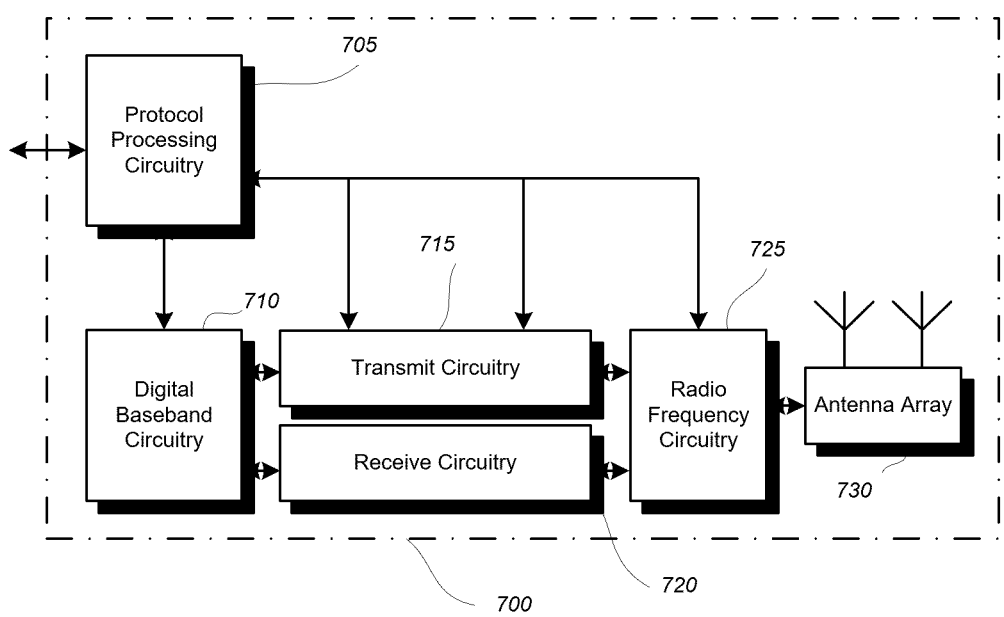
FIG. 7 illustrates an exemplary millimeter wave communication circuitry.

FIG. 7 illustrates an exemplary millimeter wave communication circuitry 700 according to some aspects. Circuitry 700 is alternatively grouped according to functions. Components as shown in 700 are shown here for illustrative purposes and may include other components not shown here in FIG. 7.

Millimeter wave communication circuitry 700 may include protocol processing circuitry 705, which may implement one or more of medium access control (MAC), radio link control (RLC), packet data convergence protocol (PDCP), radio resource control (RRC) and non-access stratum (NAS) functions. Protocol processing circuitry 705 may include one or more processing cores (not shown) to execute instructions and one or more memory structures (not shown) to store program and data information.

Millimeter wave communication circuitry 700 may further include digital baseband circuitry 710, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 700 may further include transmit circuitry 715, receive circuitry 720 and/or antenna array circuitry 730.

Millimeter wave communication circuitry 700 may further include radio frequency (RF) circuitry 725. In an aspect of at least some examples, RF circuitry 725 may include multiple parallel RF chains for one or more of transmit or receive functions, each connected to one or more antennas of the antenna array 730.

In an aspect of the disclosure, protocol processing circuitry 705 may include one or more instances of control circuitry (not shown) to provide control functions for one or more of digital baseband circuitry 710, transmit circuitry 715, receive circuitry 720, and/or radio frequency circuitry 725.

The aspects and features mentioned and described together with one or more of the previously detailed examples and figures, may as well be combined with one or more of the other examples in order to replace a like feature of the other example or in order to additionally introduce the feature to the other example.

Example 1 relates to a Processing circuitry (10) for a base station (100) of a mobile communication system, wherein the processing circuitry is configured to select one of a first uplink beamforming management mode and a second uplink beamforming mode for a beamformed uplink communication between a user equipment and the base station, wherein the selection is based on a path loss on a first wireless channel between the base station and the user equipment and based on a path loss on a second wireless channel between the user equipment and the base station. The Processing circuitry (10) is configured to provide an instruction related to the selection of the first or second uplink beamforming management mode to the user equipment.

In Example 2, the subject matter of example 1 or any of the Examples described herein may further include, that the processing circuitry is configured to determine the path loss on the first wireless channel between the base station and the user equipment.

In Example 3, the subject matter of example 2 or any of the Examples described herein may further include, that the processing circuitry is configured to obtain information on a received signal power of a downlink reference signal from the user equipment, and to determine the path loss on the first wireless channel between the base station and the user equipment based on the received signal power of the downlink reference signal and based on a transmitted signal power of the downlink reference signal.

In Example 4, the subject matter of example 3 or any of the Examples described herein may further include, that the information on the received signal power is obtained as a part of a Layer 1-Reference Signal Received Power report, L1-RSRP, of the user equipment.

In Example 5, the subject matter of one of the examples 3 to 4 or any of the Examples described herein may further include, that the downlink reference signal is one of a Synchronization Signal Block, SSB, and a Channel State Information Reference Signal, CSI-RS.

In Example 6, the subject matter of one of the examples 1 to 5 or any of the Examples described herein may further include, that the processing circuitry is configured to determine the path loss on the second wireless channel between the user equipment and the base station.

In Example 7, the subject matter of example 6 or any of the Examples described herein may further include, that the processing circuitry is configured to obtain information on a received signal power of an uplink reference signal transmitted by the user equipment, to obtain information on a transmitted signal power of the uplink reference signal transmitted by the user equipment, wherein the path loss on the second wireless channel between the user equipment and the base station is based on the received signal power of the uplink reference signal and based on the transmitted signal power of the uplink reference signal.

In Example 8, the subject matter of example 7 or any of the Examples described herein may further include, that the uplink reference signal is an uplink demodulation reference signal, wherein the information on the transmitted signal power of the uplink reference signal is transmitted over the same physical uplink channel as the uplink demodulation reference signal, and wherein the information on the received signal power of the uplink reference signal is based on a measurement performed by the base station.

In Example 9, the subject matter of example 8 or any of the Examples described herein may further include, that the uplink demodulation reference signal is a demodulation reference signal, DMRS, transmitted on a physical uplink shared channel, PUSCH, between the user equipment and the base station.

In Example 10, the subject matter of one of the examples 7 to 9 or any of the Examples described herein may further include, that the uplink reference signal comprises information on a power head room for the transmission of the uplink reference signal and information on a maximal user equipment transmission power, wherein the processing circuitry is configured to determine a transmission power of the uplink reference signal based on the power head room and based on the maximal user equipment transmission power, and to determine the path loss on the second wireless channel between the user equipment and the base station based on a received signal power of the uplink reference signal.

In Example 11, the subject matter of one of the examples 1 to 10 or any of the Examples described herein may further include, that the first uplink beamforming management mode is a reciprocity-based uplink beamforming management mode.

In Example 12, the subject matter of one of the examples 1 to 11 or any of the Examples described herein may further include, that the reciprocity-based uplink beamforming management mode is based on an assumption of a substantially reciprocal first wireless channel between the base station and the user equipment.

In Example 13, the subject matter of one of the examples 1 to 12 or any of the Examples described herein may further include, that the second uplink beamforming management mode is an uplink beamforming management mode that is based on beam sweeping of the user equipment.

In Example 14, the subject matter of example 13 or any of the Examples described herein may further include, that the second uplink beamforming management mode is an uplink beamforming management mode that is based on Sounding Reference Signal, SRS, based transmission beam sweeping.

In Example 15, the subject matter of one of the examples 1 to 14 or any of the Examples described herein may further include, that the beamformed uplink communication of the user equipment is conducted at a carrier frequency of at least 20 GHz.

Example 16 relates to a base station (100) comprising the processing circuitry (10) according to one of the examples 1 to 15.

Example 17 relates to a Processing circuitry (20) for a user equipment (200), wherein the processing circuitry is configured to obtain an instruction related to a selection of a first or a second uplink beamforming management mode for a beamformed uplink communication between the user equipment and a base station from the base station, wherein the selection is based on a path loss on a first wireless channel between the base station and the user equipment and based on a path loss on a second wireless channel between the user equipment and the base station, and use the first uplink beamforming management mode or the second uplink beamforming management mode for the beamformed uplink communication based on the instruction related to the selection.

In Example 18, the subject matter of example 17 or any of the Examples described herein may further include, that the processing circuitry is configured to provide information on a received signal power of a downlink reference signal to the base station, wherein the selection is based on the provided information on the received signal power.

In Example 19, the subject matter of example 18 or any of the Examples described herein may further include, that the information on the received signal power is provided as a part of a Layer 1-Reference Signal Received Power report, L1-RSRP.

In Example 20, the subject matter of one of the examples 18 to 19 or any of the Examples described herein may further include, that the downlink reference signal is one of a Synchronization Signal Block, SSB, and a Channel state information Reference Signal, CSI-RS.

In Example 21, the subject matter of one of the examples 17 to 20 or any of the Examples described herein may further include, that the processing circuitry is configured to affect a transmission of an uplink reference signal to the base station, wherein the selection is based on the transmitted uplink reference signal.

In Example 22, the subject matter of example 21 or any of the Examples described herein may further include, that the uplink reference signal is an uplink demodulation reference signal, wherein information on a transmitted signal power of the uplink reference signal is transmitted over the same physical uplink channel as the uplink demodulation reference signal.

In Example 23, the subject matter of example 22 or any of the Examples described herein may further include, that the uplink demodulation reference signal is a demodulation reference signal, DMRS, transmitted on a physical uplink shared channel, PUSCH, between the user equipment and the base station.

Example 24 relates to a user equipment (200) comprising the processing circuitry (20) according to one of the examples 17 to 23.

Example 25 relates to a Processing means (10) for a base station (100), configured for selecting one of a first uplink beamforming management mode and a second uplink beamforming model for a beamformed uplink communication between a user equipment and the base station, wherein the selection is based on a path loss on a first wireless channel between the base station and the user equipment and based on a path loss on a second wireless channel between the user equipment and the base station. The Processing means (10) is configured for providing an instruction related to the selection of the first or second uplink beamforming management mode to the user equipment.

In Example 26, the subject matter of example 25 or any of the Examples described herein may further include, that the processing means is configured for determining the path loss on the first wireless channel between the base station and the user equipment.

In Example 27, the subject matter of example 26 or any of the Examples described herein may further include, that the processing means is configured for obtaining information on a received signal power of a downlink reference signal from the user equipment, and for determining the path loss on the first wireless channel between the base station and the user equipment based on the received signal power of the downlink reference signal and based on a transmitted signal power of the downlink reference signal.

In Example 28, the subject matter of example 27 or any of the Examples described herein may further include, that the information on the received signal power is obtained as a part of a Layer 1-Reference Signal Received Power report, L1-RSRP, of the user equipment.

In Example 29, the subject matter of one of the examples 27 to 28 or any of the Examples described herein may further include, that the downlink reference signal is one of a Synchronization Signal Block, SSB, and a Channel state information Reference Signal, CSI-RS.

In Example 30, the subject matter of one of the examples 25 to 29 or any of the Examples described herein may further include, that the processing means is configured for determining the path loss on the second wireless channel between the user equipment and the base station.

In Example 31, the subject matter of example 30 or any of the Examples described herein may further include, that the processing means is configured for obtaining information on a received signal power of an uplink reference signal transmitted by the user equipment, and for obtaining information on a transmitted signal power of the uplink reference signal transmitted by the user equipment, wherein the path loss on the second wireless channel between the user equipment and the base station is based on the received signal power of the uplink reference signal and based on the transmitted signal power of the uplink reference signal.

In Example 32, the subject matter of one of the examples 30 to 31 or any of the Examples described herein may further include, that the uplink reference signal is an uplink demodulation reference signal, wherein the information on the transmitted signal power of the uplink reference signal is transmitted over the same physical uplink channel as the uplink demodulation reference signal, and wherein the information on the received signal power of the uplink reference signal is based on a measurement performed by the base station.

In Example 33, the subject matter of example 32 or any of the Examples described herein may further include, that the uplink demodulation reference signal is a demodulation reference signal, DMRS, transmitted on a physical uplink shared channel, PUSCH, between the user equipment and the base station.

In Example 34, the subject matter of one of the examples 31 to 33 or any of the Examples described herein may further include, that the uplink reference signal comprises information on a power head room for the transmission of the uplink reference signal and information on a maximal user equipment transmission power, wherein the processing means is configured for determining a transmission power of the uplink reference signal based on the power head room and based on the maximal user equipment transmission power, and to determine the path loss on the second wireless channel between the user equipment and the base station based on a received signal power of the uplink reference signal.

In Example 35, the subject matter of one of the examples 25 to 34 or any of the Examples described herein may further include, that the first uplink beamforming management mode is a reciprocity-based uplink beamforming management mode.

In Example 36, the subject matter of one of the examples 25 to 35 or any of the Examples described herein may further include, that the reciprocity-based uplink beamforming management mode is based on an assumption of a substantially reciprocal first wireless channel between the base station and the user equipment.

In Example 37, the subject matter of one of the examples 25 to 36 or any of the Examples described herein may further include, that the second uplink beamforming management mode is an uplink beamforming management mode that is based on beam sweeping of the user equipment.

In Example 38, the subject matter of example 37 or any of the Examples described herein may further include, that the second uplink beamforming management mode is an uplink beamforming management mode that is based on Sounding Reference Signal, SRS, based transmission beam sweeping.

In Example 39, the subject matter of one of the examples 25 to 38 or any of the Examples described herein may further include, that the beamformed uplink communication of the user equipment is conducted at a carrier frequency of at least 20 GHz.

Example 40 relates to a base station (100) comprising the processing circuitry (10) according to one of the examples 25 to 39.

Example 41 relates to a Processing means (20) for a user equipment (200), configured for obtaining an instruction related to a selection of a first or a second uplink beamforming management mode for a beamformed uplink communication between the user equipment and a base station from the base station, wherein the selection is based on a path loss on a first wireless channel between the base station and the user equipment and based on a path loss on a second wireless channel between the user equipment and the base station. The Processing means (20) is configured for using the first uplink beamforming management mode or the second uplink beamforming management mode for the beamformed uplink communication based on the instruction related to the selection.

In Example 42, the subject matter of example 41 or any of the Examples described herein may further include, that the processing means is configured for providing information on a received signal power of a downlink reference signal to the base station, wherein the selection is based on the provided information on the received signal power.

In Example 43, the subject matter of example 42 or any of the Examples described herein may further include, that the information on the received signal power is provided as a part of a Layer 1-Reference Signal Received Power report, L1-RSRP.

In Example 44, the subject matter of one of the examples 42 to 43 or any of the Examples described herein may further include, that the downlink reference signal is one of a Synchronization Signal Block, SSB, and a Channel state information Reference Signal, CSI-RS.

In Example 45, the subject matter of one of the examples 41 to 44 or any of the Examples described herein may further include, that the processing means is configured for affecting a transmission of an uplink reference signal to the base station, wherein the selection is based on the transmitted uplink reference signal.

In Example 46, the subject matter of example 45 or any of the Examples described herein may further include, that the uplink reference signal is an uplink demodulation reference signal, wherein information on a transmitted signal power of the uplink reference signal is transmitted over the same physical uplink channel as the uplink demodulation reference signal.

In Example 47, the subject matter of example 46 or any of the Examples described herein may further include, that the uplink demodulation reference signal is a demodulation reference signal, DMRS, transmitted on a physical uplink shared channel, PUSCH, between the user equipment and the base station.

Example 48 relates to a user equipment (200) comprising the processing means (20) according to one of the examples 41 to 47.

Example 49 relates to a method for a base station of a mobile communication system, the method comprising selecting (110) one of a first uplink beamforming management mode and a second uplink beamforming model for a beamformed uplink communication between a user equipment and the base station, wherein the selection is based on a path loss on a first wireless channel between the base station and the user equipment and based on a path loss on a second wireless channel between the user equipment and the base station. The method comprises providing (140) an instruction related to the selection of the first or second uplink beamforming management mode to the user equipment.

In Example 50, the subject matter of example 49 or any of the Examples described herein may further include, that the method comprises determining (120) the path loss on the first wireless channel between the base station and the user equipment.

In Example 51, the subject matter of example 50 or any of the Examples described herein may further include, that the method comprises obtaining (122) information on a received signal power of a downlink reference signal from the user equipment, and determining (120) the path loss on the first wireless channel between the base station and the user equipment based on the received signal power of the downlink reference signal and based on a transmitted signal power of the downlink reference signal.

In Example 52, the subject matter of example 51 or any of the Examples described herein may further include, that the information on the received signal power is obtained as a part of a Layer 1-Reference Signal Received Power report, L1-RSRP, of the user equipment.

In Example 53, the subject matter of one of the examples 51 to 52 or any of the Examples described herein may further include, that the downlink reference signal is one of a Synchronization Signal Block, SSB, and a Channel state information Reference Signal, CSI-RS.

In Example 54, the subject matter of one of the examples 49 to 53 or any of the Examples described herein may further include, that the method comprises determining (130) the path loss on the second wireless channel between the user equipment and the base station.

In Example 55, the subject matter of example 54 or any of the Examples described herein may further include, that the method comprises obtaining (132) information on a received signal power of an uplink reference signal transmitted by the user equipment, and obtaining (134) information on a transmitted signal power of the uplink reference signal transmitted by the user equipment, wherein the path loss on the second wireless channel between the user equipment and the base station is based on the received signal power of the uplink reference signal and based on the transmitted signal power of the uplink reference signal.

In Example 56, the subject matter of one of the examples 54 to 55 or any of the Examples described herein may further include, that the uplink reference signal is an uplink demodulation reference signal, wherein the information on the transmitted signal power of the uplink reference signal is transmitted over the same physical uplink channel as the uplink demodulation reference signal, and wherein the information on the received signal power of the uplink reference signal is based on a measurement performed by the base station.

In Example 57, the subject matter of example 56 or any of the Examples described herein may further include, that the uplink demodulation reference signal is a demodulation reference signal, DMRS, transmitted on a physical uplink shared channel, PUSCH, between the user equipment and the base station.

In Example 58, the subject matter of one of the examples 55 to 57 or any of the Examples described herein may further include, that the uplink reference signal comprises information on a power head room for the transmission of the uplink reference signal and information on a maximal user equipment transmission power, wherein the method comprises determining (134) a transmission power of the uplink reference signal based on the power head room and based on the maximal user equipment transmission power, and to determine the path loss on the second wireless channel between the user equipment and the base station based on a received signal power of the uplink reference signal.

In Example 59, the subject matter of one of the examples 49 to 58 or any of the Examples described herein may further include, that the first uplink beamforming management mode is a reciprocity-based uplink beamforming management mode.

In Example 60, the subject matter of one of the examples 49 to 58 or any of the Examples described herein may further include, that the reciprocity-based uplink beamforming management mode is based on an assumption of a substantially reciprocal first wireless channel between the base station and the user equipment.

In Example 61, the subject matter of one of the examples 49 to 60 or any of the Examples described herein may further include, that the second uplink beamforming management mode is an uplink beamforming management mode that is based on beam sweeping of the user equipment.

In Example 62, the subject matter of example 61 or any of the Examples described herein may further include, that the second uplink beamforming management mode is an uplink beamforming management mode that is based on Sounding Reference Signal, SRS, based transmission beam sweeping.

In Example 63, the subject matter of one of the examples 49 to 62 or any of the Examples described herein may further include, that the beamformed uplink communication of the user equipment is conducted at a carrier frequency of at least 20 GHz.

Example 64 relates to a method for a mobile device, the method comprising obtaining (230) an instruction related to a selection of a first or a second uplink beamforming management mode for a beamformed uplink communication between the user equipment and a base station from the base station, wherein the selection is based on a path loss on a first wireless channel between the base station and the user equipment and based on a path loss on a second wireless channel between the user equipment and the base station. The method comprises using (240) the first uplink beamforming management mode or the second uplink beamforming management mode for the beamformed uplink communication based on the instruction related to the selection.

In Example 65, the subject matter of example 64 or any of the Examples described herein may further include, that the method comprises providing (210) information on a received signal power of a downlink reference signal to the base station, wherein the selection is based on the provided information on the received signal power.

In Example 66, the subject matter of example 65 or any of the Examples described herein may further include, that the information on the received signal power is provided as a part of a Layer 1-Reference Signal Received Power report, L1-RSRP.

In Example 67, the subject matter of one of the examples 65 to 66 or any of the Examples described herein may further include, that the downlink reference signal is one of a Synchronization Signal Block, SSB, and a Channel state information Reference Signal, CSI-RS.

In Example 68, the subject matter of one of the examples 64 to 67 or any of the Examples described herein may further include, that the method comprises affecting (220) a transmission of an uplink reference signal to the base station, wherein the selection is based on the transmitted uplink reference signal.

In Example 69, the subject matter of example 68 or any of the Examples described herein may further include, that the uplink reference signal is an uplink demodulation reference signal, wherein information on a transmitted signal power of the uplink reference signal is transmitted over the same physical uplink channel as the uplink demodulation reference signal.

In Example 70, the subject matter of example 69 or any of the Examples described herein may further include, that the uplink demodulation reference signal is a demodulation reference signal, DMRS, transmitted on a physical uplink shared channel, PUSCH, between the user equipment and the base station.

Example 71 relates to a machine readable storage medium including program code, when executed, to cause a machine to perform the method of one of the Examples 49 to 63, or the method of one of the Examples 64 to 70.

Example 72 relates to a computer program having a program code for performing the method of one of the Examples 49 to 63, or the method of one of the Examples 64 to 70, when the computer program is executed on a computer, a processor, or a programmable hardware component.

Example 73 relates to a machine readable storage including machine readable instructions, when executed, to implement a method or realize an apparatus as claimed in any pending claim or shown in any Example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. Processing circuitry for a base station of a mobile communication system, wherein the processing circuitry is configured to:
   select one of a first uplink beamforming management mode and a second uplink beamforming management mode for a beamformed uplink communication between a user equipment and the base station, wherein the first uplink beamforming management mode is a reciprocity-based up-link beamforming management mode and wherein the second uplink beamforming management mode is an uplink beamforming management mode that is based on beam sweeping of the user equipment;
   comparing a difference between a path loss on a first wireless channel between the base station and the user equipment and a path loss on a second wireless channel between the user equipment and the base station to a threshold;
   selecting one of the first or the second uplink beamforming management modes if the difference or an absolute value of the difference is greater than the threshold; and provide an instruction related to the selection of the first or second uplink beamforming management mode to the user equipment.

2. The processing circuitry according to claim 1, wherein the processing circuitry is configured to determine the path loss on the first wireless channel between the base station and the user equipment.

3. The processing circuitry according to claim 2, wherein the processing circuitry is configured to obtain information on a received signal power of a downlink reference signal from the user equipment, and to determine the path loss on the first wireless channel between the base station and the user equipment based on the received signal power of the downlink reference signal and based on a transmitted signal power of the downlink reference signal.

4. The processing circuitry according to claim 3, wherein the information on the received signal power is obtained as a part of a Layer 1-Reference Signal Received Power report (L1-RSRP) of the user equipment.

5. The processing circuitry according to claim 3, wherein the downlink reference signal is one of a Synchronization Signal Block (SSB) and a Channel State Information Reference Signal (CSI-RS).

6. The processing circuitry according to claim 1, wherein the processing circuitry is configured to determine the path loss on the second wireless channel between the user equipment and the base station.

7. The processing circuitry according to claim 6, wherein the processing circuitry is configured to obtain information on a received signal power of an uplink reference signal transmitted by the user equipment, to obtain information on a transmitted signal power of the uplink reference signal transmitted by the user equipment, wherein the path loss on the second wireless channel between the user equipment and the base station is based on the received signal power of the uplink reference signal and based on the transmitted signal power of the uplink reference signal.

8. The processing circuitry according to claim 7, wherein the uplink reference signal is an uplink demodulation reference signal, wherein the information on the transmitted signal power of the uplink reference signal is transmitted over the same physical uplink channel as the uplink demodulation reference signal, and wherein the information on the received signal power of the uplink reference signal is based on a measurement performed by the base station.

9. The processing circuitry according to claim 8, wherein the uplink demodulation reference signal is a demodulation reference signal (DMRS) transmitted on a physical uplink shared channel (PUSCH) between the user equipment and the base station.

10. The processing circuitry according to claim 7, wherein the uplink reference signal comprises information on a power head room for the transmission of the uplink reference signal and information on a maximal user equipment transmission power, wherein the processing circuitry is configured to determine a transmission power of the uplink reference signal based on the power head room and based on the maximal user equipment transmission power, and to determine the path loss on the second wireless channel between the user equipment and the base station based on a received signal power of the uplink reference signal.

11. The processing circuitry according to claim 1, wherein the reciprocity-based uplink beamforming management mode is based on an assumption of a substantially reciprocal first wireless channel between the base station and the user equipment.

12. The processing circuitry according to claim 1, wherein the second uplink beamforming management mode is an uplink beamforming management mode that is based on Sounding Reference Signal (SRS) based transmission beam sweeping.

13. The processing circuitry according to claim 1, wherein the beamformed uplink communication of the user equipment is conducted at a carrier frequency of at least 20 GHz.

14. Processing circuitry for a user equipment, wherein the processing circuitry is configured to:
obtain an instruction related to a selection of a first or a second uplink beamforming management mode for a beamformed uplink communication between the user equipment and a base station from the base station,
wherein the first uplink beamforming management mode is a reciprocity-based up-link beamforming management mode, and wherein the second uplink beamforming management mode is an uplink beamforming management mode that is based on beam sweeping of the user equipment,
wherein the selection is based on a comparison of a threshold and a difference of a path loss on a first wireless channel between the base station and the user equipment and a path loss on a second wireless channel between the user equipment and the base station,
wherein the one of the first or the second uplink beamforming management mode is selected if the difference or an absolute value of the difference is greater than the threshold; and
use the first uplink beamforming management mode or the second uplink beamforming management mode for the beamformed uplink communication based on the instruction related to the selection.

15. The processing circuitry according to claim 14, wherein the processing circuitry is configured to provide information on a received signal power of a downlink reference signal to the base station, wherein the selection is based on the provided information on the received signal power.

16. The processing circuitry according to claim 15, wherein the information on the received signal power is provided as a part of a Layer 1-Reference Signal Received Power report (L1-RSRP).

17. The processing circuitry according to claim 16, wherein the downlink reference signal is one of a Synchronization Signal Block (SSB) and a Channel State Information Reference Signal (CSI-RS).

18. The processing circuitry according to claim 14, wherein the processing circuitry is configured to affect a transmission of an uplink reference signal to the base station, wherein the selection is based on the transmitted uplink reference signal.

19. The processing circuitry according to claim 18, wherein the uplink reference signal is an uplink demodulation reference signal, wherein information on a transmitted signal power of the uplink reference signal is transmitted over the same physical uplink channel as the uplink demodulation reference signal.

20. A method for a base station of a mobile communication system, the method comprising:
selecting one of a first uplink beamforming management mode and a second uplink beamforming model for a beamformed management uplink communication between a user equipment and the base station,
wherein the first uplink beamforming management mode is a reciprocity-based up-link beamforming management mode, and wherein the second uplink beamforming management mode is an uplink beamforming management mode that is based on beam sweeping of the user equipment;

comparing a difference between a path loss on a first wireless channel between the base station and the user equipment and based on a path loss on a second wireless channel between the user equipment and the base station to a threshold;

selecting one of the first or the second uplink beamforming management mode if the difference or an absolute value of the difference is greater than the threshold; and providing an instruction related to the selection of the first or second uplink beamforming management mode to the user equipment.

21. A non-transitory, computer-readable medium comprising a program code that, when the program code is executed on a processor, a computer, or a programmable hardware component, causes the processor, computer, or programmable hardware component to perform the method of claim 20.

22. A method for a mobile device, the method comprising:
obtaining an instruction related to a selection of a first or a second uplink beamforming management mode for a beamformed uplink communication between the user equipment and a base station from the base station,
wherein the first uplink beamforming management mode is a reciprocity-based up-link beamforming management mode, and wherein the second uplink beamforming management mode is an uplink beamforming management mode that is based on beam sweeping of the user equipment,
wherein the selection is based on a comparison of a threshold and a difference of a path loss on a first wireless channel between the base station and the user equipment and a path loss on a second wireless channel between the user equipment and the base station to a threshold
wherein the one of the first or the second uplink beamforming management mode is selected if the difference or an absolute value of the difference is greater than the threshold; and
using the first uplink beamforming management mode or the second uplink beamforming management mode for the beamformed uplink communication based on the instruction related to the selection.

23. A non-transitory, computer-readable medium comprising a program code that, when the program code is executed on a processor, a computer, or a programmable hardware component, causes the processor, computer, or programmable hardware component to perform the method of claim 22.

* * * * *